(No Model.)
G. H. BLAKEMAN.
VEHICLE SPRING.
No. 395,608. Patented Jan. 1, 1889.
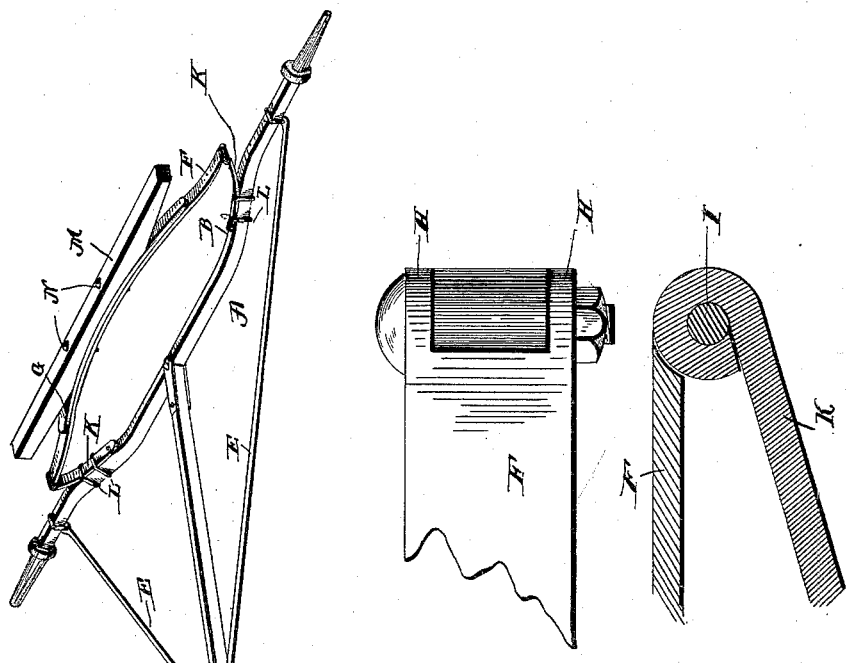

UNITED STATES PATENT OFFICE.

GEORGE H. BLAKEMAN, OF BIRMINGHAM, CONNECTICUT.

VEHICLE-SPRING.

SPECIFICATION forming part of Letters Patent No. 395,608, dated January 1, 1889.

Application filed June 6, 1888. Serial No. 276,228. (No model.)

*To all whom it may concern:*

Be it known that I, GEORGE H. BLAKEMAN, a citizen of the United States, residing at Birmingham, in the county of New Haven and State of Connecticut, have invented a new and useful Improvement in Vehicle-Springs, of which the following is a specification.

My invention relates to an improvement in vehicle-springs; and it consists in the peculiar construction and combination of devices that will be more fully set forth hereinafter, and particularly pointed out in the claim.

In the accompanying drawings, Figure 1 is a perspective view of a vehicle running-gear provided with springs embodying my improvement. Fig. 2 represents detail views in plan and section, showing the means for connecting the members of the springs together.

A represents the axles, which have their central portions bowed downward, as shown at B, and are connected by the reach C in the usual manner, the said reach having its rear end connected to the ends of the rear axles by means of brace-rods E, and having its front end connected to the center of the front axle by means of a pivotal bolt, D.

F represents a pair of springs, which have their upper portions semi-elliptical in shape and formed of leaves G in the usual manner. The ends of the upper portions of the springs are provided at their corners with depending circular ears H, which are provided with central openings adapted for the insertion of coupling-bolts.

K represents the lower sections of the springs, which are straight, as shown, and have their outer ends bent around the bolts I, so as to effect a flexible connection between the said sections K and the upper portions of the springs. The inner ends of the sections K bear upon the upper sides of the axles and are in contact with the inclined portions of the axles which are at the ends of the bowed central sections thereof, and the said inner ends of the said sections K are rigidly secured to the axles by means of clip-bolts L. A spring-bar, M, of the usual construction, is secured to the upper side of the rear spring at the center thereof by means of bolts N.

O represents a head-block which is arranged on the upper side of the front spring, and is bolted thereto, and P represents a spring-bar which is arranged above the head-block. A fifth-wheel, R, has its members secured to the spring-bar P and to the head-block O, and a bolt, S, extends downward through the center of the bar P and of the head-block and of the front spring, and serves as a king-bolt to permit the front spring to turn with the front axle. Said bolt S is directly in line with the bolt D.

The operation of my invention is as follows: When the vehicle is loaded, the short springs or sections K are forced downward on the ends of the axles and the upper sections of the springs are caused to elongate. The short springs K yield when the wheels of the vehicle pass over ruts or rough places in the road, and prevent the springs F from imparting unpleasant vertical movement to the body of the vehicle, thereby causing the same to ride very evenly and smoothly.

I am aware that heretofore a running-gear has been provided in which semi-elliptical springs have been employed having short springs hinged to their ends, which are secured to the axle, and I make no claim, broadly, to such an arrangement.

It will be observed that I employ short straight springs, which are fastened to the axle and rest upon the inclined portions of the bowed axle, whereas, as far as I am aware, the devices heretofore produced have employed short curved springs secured to either a straight axle or the straight portion of a bent axle.

When a curved spring is used, if the vehicle be loaded the curved springs will coil up and bend inward, thereby bowing the semi-elliptical springs and allowing the body to oscillate laterally. In my device, however, when the body is loaded the short straight springs will be forced downward against the inclined portions of the bowed axle, being thereby re-enforced and straightening the semi-elliptical spring so as to provide a broader support for the body and prevent lateral oscillation of the same.

Having thus described my invention, I claim—

The combination, with the downwardly-bowed axle and the semi-elliptical springs

F, of the short straight springs having their outer ends hinged to the ends of the semi-elliptical spring and their inner ends secured to the axle, the intermediate portions of said springs resting on the inclined portions of the axle, as specified.

In testimony that I claim the foregoing as my own I have hereto affixed my signature in presence of two witnesses.

GEORGE H. BLAKEMAN.

Witnesses:
JAMES R. GEDDES,
CHAS. E. BUNNELL.